United States Patent Office 3,845,031
Patented Oct. 29, 1974

3,845,031
METHOD FOR HALOGENIZING SURFACES OF SYNTHETIC AND/OR NATURAL RUBBER MATERIAL
Josephus Sychbertus Adrianus Langerwerf, Waalwijk, Netherlands, assignor to Nederlandse Organisatie Voor Toegepast-Natuurwetenschappelijk Onderzoek Ten Behoeve Van Nijverheid, The Hague, Netherlands
No Drawing. Filed Apr. 19, 1973, Ser. No. 352,616
Claims priority, application Netherlands, Apr. 26, 1972, 7205638
The term of this patent subsequent to Feb. 19, 1991, has been disclaimed
Int. Cl. C08d 5/04
U.S. Cl. 260—96          2 Claims

ABSTRACT OF THE DISCLOSURE

The invention relates to the halogenation of rubber materials whereby their adhesive properties are improved by bringing the rubber material in contact with a halogen donor. According to the invention the donor consists of a non-acidified solution of a N-halogen sulphonamide and pyridine.

---

The invention relates to a method for halogenizing surfaces of synthetic and/or natural material in order to make these surfaces better glueable to rubber or other materials.

Such methods are known in the art. For instance, the rubber material is dipped in acidified bleaching lye for a few minutes. For a number of rubbers this does not yield reliable results. The use of a solution of 2–4 percent of chlorine gas in carbon tetrachloride is inconvenient because of the poisonousness and corrosiveness of the solution.

The method for halogenizing surfaces of synthetic and/or natural rubber material with a halogen donor in order to make these surfaces better glueable to rubber or other materials is, according to the invention, characterized in that a non-acidified solution of a N-halogen sulphonamide with the formula:

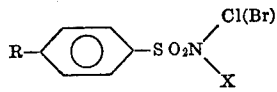

in which R is H or $CH_3$ and X is H or Cl or Br in the presence of pyridine is applied to such surface.

Suitable solvents are benzene, toluene, ethyl, acetate, carbon tetrachloride, tetrachloro ethene, tertiary butanol and in general solvents that are difficult to halogenize. Mixtures of solvents are equally usable. Very satisfactory as a solvent is a mixture of ethyl acetate and tertiary butanol, e.g. 1 part by weight of tertiary butanol per 4 parts by weight of ethyl acetate. Preferably, the solvents must be able to evaporate easily, because otherwise they remain on the rubber surface, which is undesirable for further processing.

The quantity of pyridine, calculated on the applied mixture, preferably lies in the order of 0.05 to 20 percent by weight. The quantity of N-halogen sulphonamide, calculated on the applied mixture, preferably lies between 0.3 to 20 percent. The halogenizing effect tends to diminish above 20%.

As for the stability of the halogenation agent according to the inventions, the following can be observed.

Under all conditions an ordinary N-halogen sulphonamide solution is unstable; the activity is very quickly lost. If the solution contains pyridine, however, it is very stable. For that purpose even some tenths of percent are sufficient; an increase in the pyridine concentration above 15 percent by weight of pyridine is much less effective because the keeping qualities of the solution are then already practically unlimited, so it maintains its halogenizing activity for a long time. Quantities of 0.5 to 12 percent by weight of pyridine meet all the reasonable demands of practice as regards keeping qualities. Moreover, the halogenizing effect tends to diminish above 20% of pyridine.

Per se the keeping qualities of a solution of the N-halogen sulphonamide can be raised by putting a little of a strong base e.g. NaOH into the solution, but already a very small quantity of such a base (less than 1/10 percent by weight) causes the agent not to have a halogenizing effect any longer, which manifests itself by the fact that the adhesive applied loosens very easily from a rubber surface halogenized with this agent. A method to determine the quality of the adhesion is described in Techniquir, 2 (1968), page 59.

The surface to which the rubber surface is glued can be of a very different nature provided such surface adheres to the adhesive. If one wants to adhere rubber to rubber, then preferably, one will halogenize both surfaces. Furthermore, glueing to leather and synthetic leg materials, to paper, textile, plastics and the like is very well possible.

The rubber to be halogenized can be compact but also microcellular or even porous. The rubber can be vulcanized or not; in practice mostly vulcanized rubber is used. The method is also suitable for thermoplastic rubber.

Immediately after the evaporation glueing can be effected. No significant differences have been found between rubber surfaces that had been glued 1 minute and those which had been glued 1 month after halogenizing. Sometimes it may be of some advantage if just before halogenizing the rubber surface it is covered with a small amount of swelling agent such as toluene, hexane, or ethyl acetate. There are some cases in which this seems to be imperative. It was found, however, that in those cases just as good if not better results were obtained if the halogenation agent was rubbed in with somewhat more strength.

It is known in the art that halogenizing rubber surfaces is conducive to the adhesion of all kinds of adhesives onto the rubber surface. In the shoe industry it is the custom to use, adhesives based on polyurethane or polychloropropene, although those based on polyurethane react better to halogenation of the surface.

A very large number of various kinds and types of rubber were tested to determine the difference between the adhesion on treated and non-treated surfaces. In all cases the adhesion in case of the rubber surfaces that had been treated was substantially to very substantially better than the adhesion on non-treated and on roughened rubber surfaces. Many of these tests were carried out with a halogenizing mixture containing a 10% solution by weight of N-monochloro sulphonamide and 1.0 to 10.0 percent by weight of pyridine, the whole being dissolved in a mixture of 20% of tertiary butanol and 80% of ethyl acetate. The strength of the adhesive joint in a number of cases varied from 110 to 150 N/cm. strip width. This variation is not a result of the quantity of pyridine but rather is due to variation in strength of the rubber.

It makes little difference whether the rubber had been roughened previously or not, for which reason in practice roughening is omitted.

Both N-chloro- and N-bromosulphonamide can be used as halogen doners. The chlorine product is cheaper and therefore, it was used in most tests.

I claim:
1. A method for halogenizing surfaces of synthetic and/or natural rubber material with a halogen donor in order to make these surfaces better glueable to rubber or other materials, wherein in the presence of pyridine a non-acidified solution of a N-halogen sulphonamide having the general formula

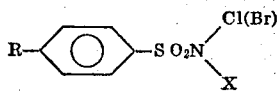

in which R is H or CH$_3$ and X is H or Cl or Br is applied to such surface, and further wherein, calculated on the applied solution, the quantity of pyridine amounts to 0.05 to 20%, and the quantity of N-halogen sulphonamide amounts to 0.3 to 20% by weight.

2. A method according to claim 1, wherein calculated on the applied solution the quantity of pyridine amounts to 0.5 to 12 percent by weight.

References Cited
UNITED STATES PATENTS 2,748,105  5/1956  Becker et al. __ 260—96 HAL X
3,009,904  11/1961  Serniuk et al. __ 260—96 HAL X

OTHER REFERENCES

Ser. No. 252,228, filed Apr. 19, 1972.

JOSEPH L. SCHOFER, Primary Examiner

W. F. HAMROCK, Assistant Examiner

U.S. Cl. X.R.

161—153, 240; 260—85.1, 92.3, 94.7, 770